United States Patent
Dupuis

(10) Patent No.: US 6,213,258 B1
(45) Date of Patent: Apr. 10, 2001

(54) DRUM BRAKE USING AUTOMATIC COMPENSATION FOR CLEARANCE AND SELECTIVE INHIBITION

(75) Inventor: Vincent Dupuis, Vincennes (FR)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/381,817

(22) PCT Filed: Sep. 9, 1999

(86) PCT No.: PCT/FR99/02146

§ 371 Date: Sep. 24, 1999

§ 102(e) Date: Sep. 24, 1999

(87) PCT Pub. No.: WO00/17538

PCT Pub. Date: Mar. 30, 2000

(30) Foreign Application Priority Data

Sep. 23, 1998 (FR) .................................................. 98 11904

(51) Int. Cl.[7] .................................................. F16D 51/00
(52) U.S. Cl. .................................... 188/79.53; 188/79.51
(58) Field of Search ........................... 188/79.51, 79.53, 188/79.54, 78, 328

(56) References Cited

U.S. PATENT DOCUMENTS

| Re. 36,312 | * | 9/1999 | Muzzy | 188/79.56 |
| 5,388,671 | * | 2/1995 | Rupprecht | 188/79.51 |
| 5,752,586 | * | 5/1998 | Evans | 188/79.56 |
| 5,913,390 | * | 6/1999 | Hostetler | 188/79.51 |

* cited by examiner

Primary Examiner—Christopher P. Schwartz
(74) Attorney, Agent, or Firm—Leo H McCormick Jr.; Warren Comstock

(57) ABSTRACT

A drum brake having an adjustable-length strut (6) to compensate for clearance due to wear between first (21a) and second (22a) friction members and a drum (1). The adjustment being achieved by the rotation of a toothed wheel (7) driven by an adjustment blade (51) mounted on a rocking lever (5). The rocking lever (5) has an inhibitor blade (52) which intercepts the toothed wheel (7) whenever a risk of excessive adjustment occurs by disengaging the adjustment blade (51) from the toothed wheel (7). The inhibitor blade (52) prevents subsequent rotation of the toothed wheel (7) until the risk of excessive adjustment dissipates.

5 Claims, 3 Drawing Sheets

DRUM BRAKE USING AUTOMATIC COMPENSATION FOR CLEARANCE AND SELECTIVE INHIBITION

The present invention relates to drum brakes of the type equipped with a mechanism for automatically compensating for clearance, able to compensate for the wear of the friction linings.

BACKGROUND OF THE INVENTION

More specifically, the invention relates to a drum brake comprising at least: a drum; two shoes in the shape of arcs of a circle, arranged facing an internal face of the drum and carrying respective friction linings; an actuator inserted between the shoes and operated selectively to make the shoes move, in a centrifugal movement towards the internal face of the drum; a spring connecting the shoes to move them closer together, in a centripetal movement counter to the centrifugal movement as soon as the actuator is no longer being operated; a rocking lever carrying an adjustment blade and which moves in a back and forth angular movement consisting of two pivoting movements in opposite directions, correlated with the centrifugal and centripetal movements of the shoes; an adjustable-length strut inserted between the shoes to limit their centripetal movement, and comprising two threaded elements forming a screw-nut connection, the length of this strut being adjusted by unscrewing the screw-nut connection as the friction linings wear; and a toothed wheel secured to one of the elements of the screw-nut connection and selectively rotated by the adjustment blade during a first of the pivoting movements of the rocking lever, the adjustment blade extending, lengthwise, transversely with respect to the toothed wheel, developing widthwise in a mean plane parallel to the first pivoting movement, and interfacing with the toothed wheel, during the first pivoting movement, rather more tangentially than radially.

This type of drum brake is well known to those skilled in the art and is, for example, illustrated in U.S. Pat. No. 4,502,574 the teaching of which is incorporated into this description.

Despite their attraction as a result of the simplicity of their structure, such brakes sometimes tend to lock when subjected to an excessive actuating force, particularly if they have been used in extreme conditions which have led to a significant rise in temperature.

SUMMARY OF THE INVENTION

In this context, the specific objective of the present invention is to propose a drum brake of this type, but which is less sensitive to such extreme service conditions.

To this end, of the invention [sic] employs a rocking lever equipped with an inhibitor blade capable of intercepting the toothed wheel as soon as a risk of excessive adjustment occurs, and of causing the adjustment blade to disengage from the toothed wheel, thus preventing any subsequent rotation of the toothed wheel at least until the risk of excessive adjustment has disappeared.

More specifically, the drum brake of the invention, which in other respects is in accordance with the description given in the above preamble, is essentially characterized in that the lever bears an inhibitor blade extending lengthwise parallel to the adjustment blade, developing widthwise in a plane essentially perpendicular to the mean plan of the adjustment blade, flexible transversely with respect to its plane, adopting within its plane a position of rest from which it can move elastically by limited-amplitude deflections in the direction of its width, and selectively intercepting the toothed wheel, and in that the adjustment blade follows the deflections of the inhibitor blade, the toothed wheel thus escaping the influence of the adjustment blade when it is driving the inhibitor blade after having been intercepted by this inhibitor blade.

According to an advantageous embodiment of the invention, the inhibitor blade consists of a bimetallic element and moves closer to the toothed wheel by a movement that is transverse with respect to its plane, when there is a rise in temperature.

The lever may, for example, have a branch arranged at right angles to the adjustment blade and attached to it by a common base, this branch being, on the one hand, mounted so that it can pivot, via an end distant from the base, on a pin secured to one of the shoes and, on the other hand, mounted so that it can pivot, via an end adjacent to the base, on one end of the strut, and the spring bearing upon a point of the branch that is part way between the ends of this branch.

Finally, the lever preferably has a fold adjacent to the base that is common to the adjustment blade and to the branch, that is parallel to the plane of the inhibitor blade, and with which the inhibitor blade is integral.

Other features and advantages of the invention will emerge clearly from the description thereof given hereafter by way of non-limiting indication with reference to the appended drawings.

DETAILED DESCRIPTION OF THE INVENTION

Figure 1:
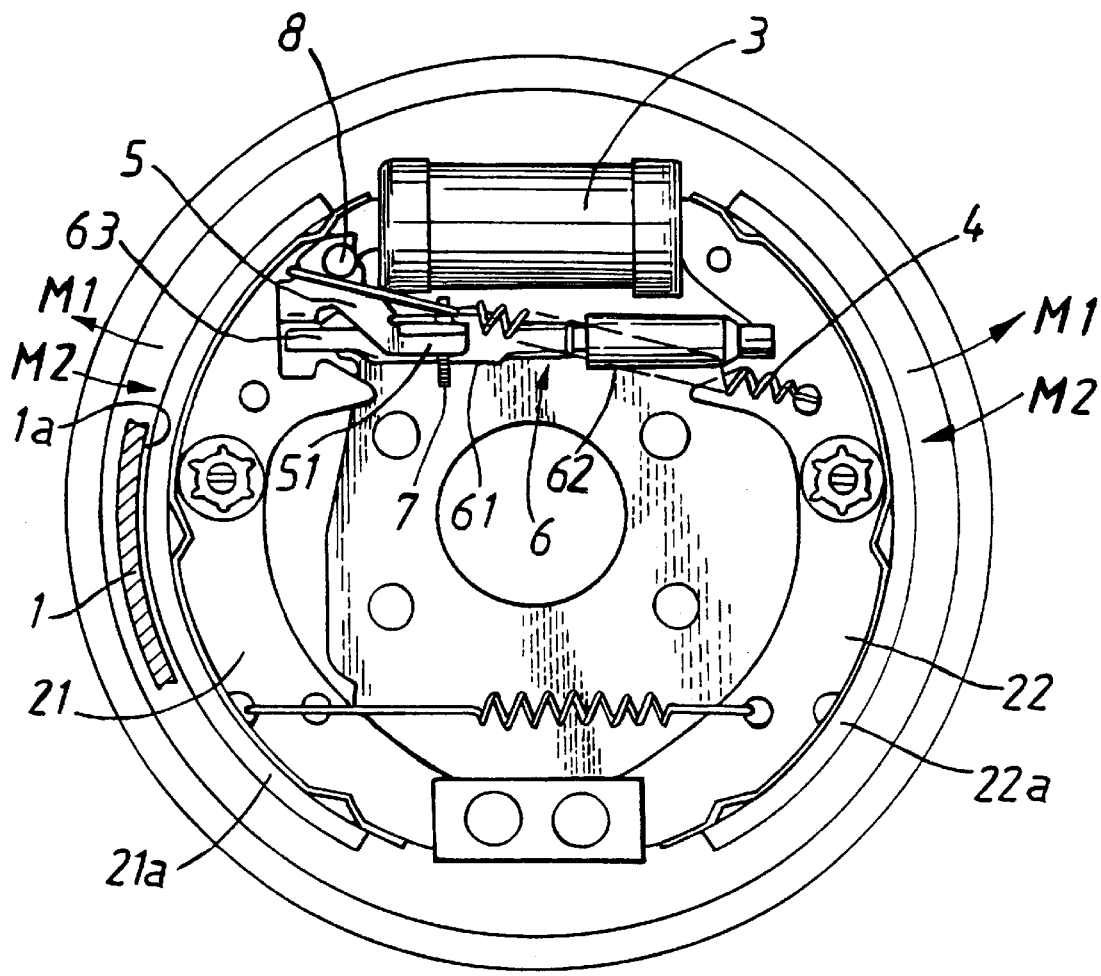
FIG. 1 is a simplified front view of the drum brake described and illustrated in the aforementioned patent and to which the present invention may be applied.

The invention relates to a drum brake of the type which, as shown in FIG. 1, mainly comprise a drum 1; two shoes 21, 22 in the shape of arcs of a circle, bearing respective friction linings 21a, 22a; an actuator 3; a spring 4; a rocking lever 5; an adjustable-length strut 6; and a toothed wheel 7, selectively rotated in order to lengthen the strut 6 as a function of the wear of the linings 21a and 22a.

The two shoes 21, 22 are arranged facing an internal face 1a of the drum 1 and are pulled towards each other by the spring 4.

The actuator 3, inserted between the shoes 21, 22, is operated selectively to move the shoes, in a centrifugal movement M1, towards the internal face 1a of the drum, the spring 4 therefore having the effect of moving the shoes 21, 22 closer together in a centripetal movement M2 counter to the centrifugal movement M1, as soon as the actuator 3 is no longer being operated.

The rocking lever 5 carries an adjustment blade 51 and pivots, about a pin 8, in a first direction, when the shoes move apart in their centrifugal movement M1, and in a second direction, the opposite of the first, when the shoes move closer together in their centripetal movement M2.

The strut 6 is inserted between the shoes 21, 22 to limit their centripetal movement, and comprises two threaded elements 61, 62 forming a screw-nut connection, the length of this strut being adjusted as the friction linings 21a, 22a wear, by unscrewing the screw-nut connection via the toothed wheel 7, this wheel being secured to one of the elements 61 of the screw-nut connection and being rotated selectively by the adjustment blade 51 as the rocking lever 5 pivots in the first direction.

Figure 2:
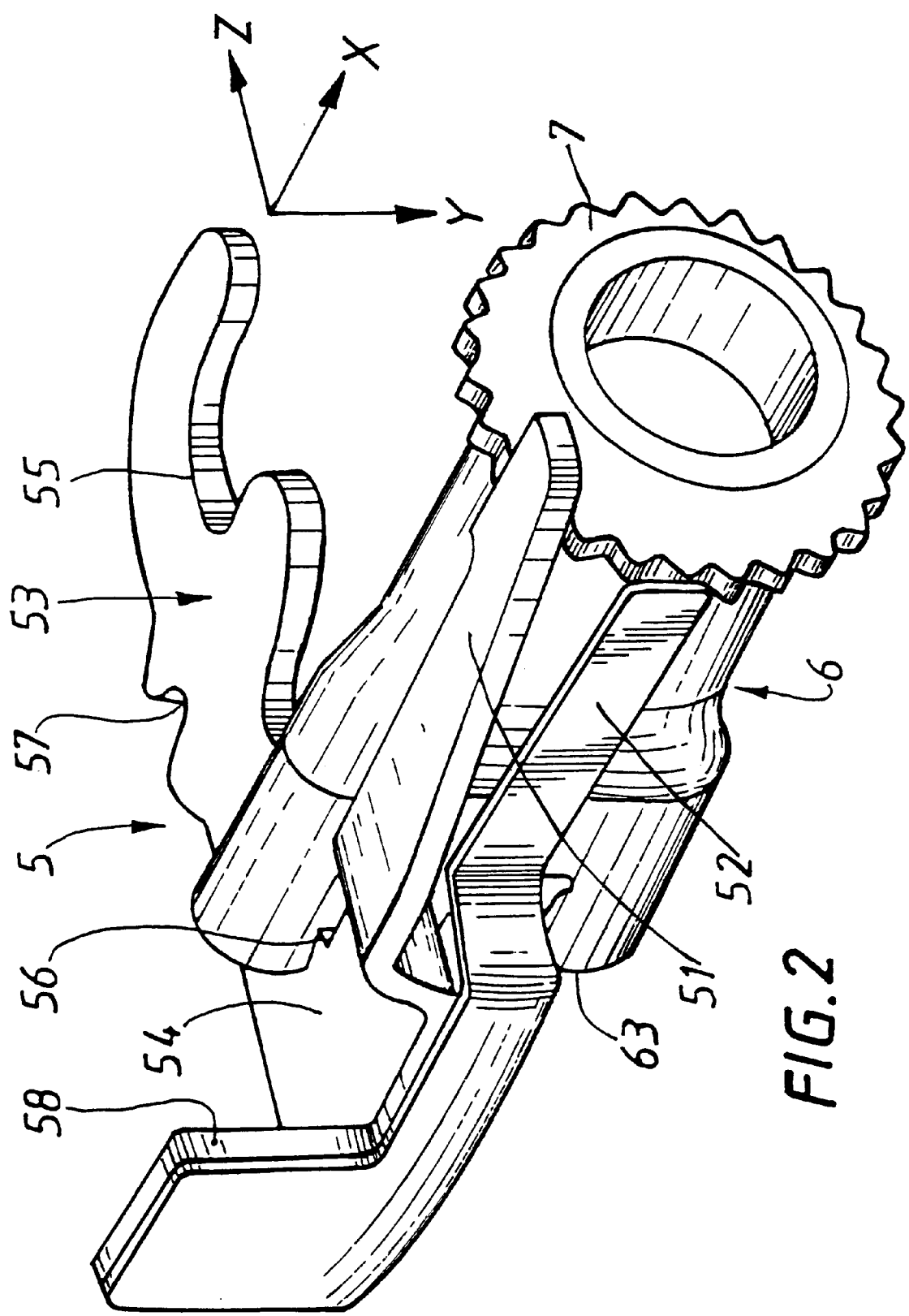
FIG. 2 is a perspective view of part of the strut of a brake in accordance with the invention, and by means of which such a brake can be differentiated from the known brake of FIG. 1.

As shown by FIG. 2 which, for reasons of clarity, includes an orthonormal reference frame XYZ, the adjustment blade 51 extends, lengthwise, in the X direction, that is to say transversely with respect to the plane YZ of the toothed wheel, and develops widthwise in a mean plane XZ parallel to the pivoting movement of the lever 5.

The adjustment blade 51 is also arranged in such a way as to interface with the toothed wheel 7, as the lever 5 pivots in the first direction, rather more tangentially than radially.

As mentioned earlier, known brakes of this type are sensitive to certain limiting operating conditions and may lock in the event of intense actuation, causing deformation of the drum, usually accompanied by an abnormal rise in temperature.

To avoid this defect, the brake of the invention is essentially distinguished from the known brake on the one hand, by the fact that the lever 5 bears an inhibitor blade 52 which extends lengthwise parallel to the adjustment blade 51, which develops widthwise in a plane XY essentially perpendicular to the mean plane XZ of the adjustment blade 51, which is flexible transversely with respect to its plane, which adopts within its plane XY a position of rest from which it can move elastically by limited-amplitude deflections in the direction of its width, and which selectively intercepts the toothed wheel 7, and, on the other hand, by the fact that the adjustment blade 51 follows the deflections of the inhibitor blade 52, the toothed wheel 7 thus escaping the influence of the adjustment blade 51 when it is driving the inhibitor blade 52 after having been intercepted by this inhibitor blade 52.

FIGS. 3A to 3F illustrate the operation of the brake of the invention, in this case considered as including an additional highly advantageous although not essential feature whereby the inhibitor blade 52 consists of a bimetallic element so that it can be moved closer to the toothed wheel 7, by a movement that is transverse with respect to its plane XY, when there is a rise in temperature.

From now on we shall use the following terminology conventions.

"Unexpanded brake" denotes the state of the brake at rest, the shoes 21 and 22 being moved closer together by the spring 4.

"Expanded brake" denotes the state of the brake during actuation, the shoes 21 and 22 being moved apart and pressed against the internal face 1a of the drum 1 by the actuator 3.

"Take a tooth" or "engage a tooth" denote the action whereby the adjustment blade 51 passes from one tooth of the wheel to the next tooth, as the brake returns to the unexpanded condition.

"J" denotes the functional clearance of the brake, that is to say the diametrical clearance separating the drum from the linings 21a, 22a when the brake is in the unexpanded condition.

"Jo" denotes the nominal operating clearance of the brake, that is to say the functional clearance for which the brake was designed.

Figure 3:
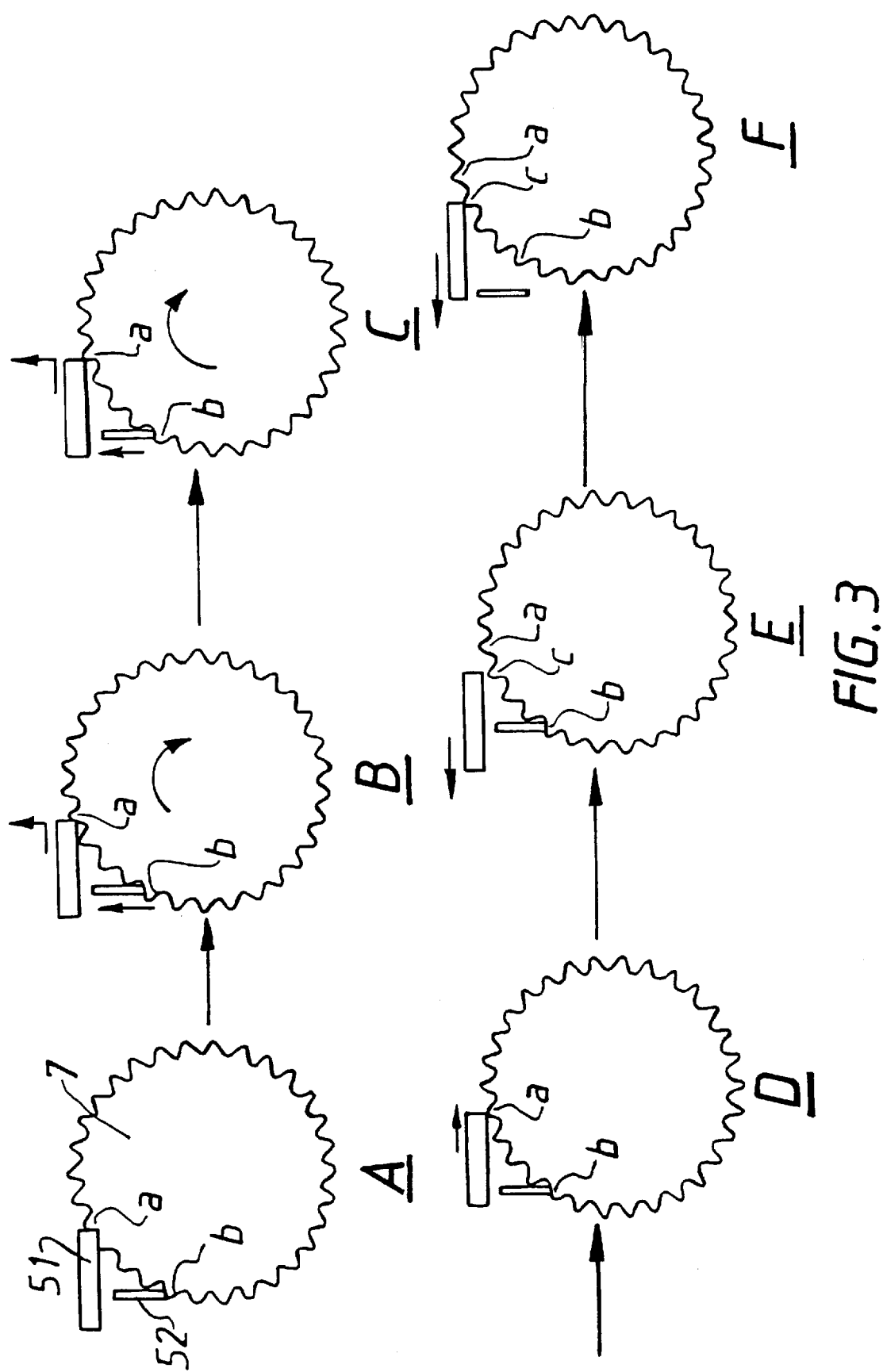
FIG. 3, made up of views 3A to 3F, illustrates various operating configurations of the brake of the invention.

"Normal" and "high" respectively denote the temperatures for which the bimetallic element which forms the inhibitor blade in the particular embodiment illustrated in FIG. 3 adopts its basic configuration and its deformed configuration.

The various views 3A to 3F of FIG. 3 correspond to the following conditions.

View 3A: Unexpanded brake. High temperature. The adjustment blade 51 is in the position of rest having engaged tooth "a". The inhibitor blade 52 is in its deformed configuration and resting on tooth "b".

View 3B: Expanded brake. High temperature. The adjustment blade 51 has moved by a distance corresponding to the clearance "J". Because the toothed wheel 7 has been rotated by the adjustment blade 51, tooth "b" lifts the inhibitor blade 52. The adjustment blade 51, which follows the movement of the inhibitor blade 52, is lifted in it turn.

View 3C: Expanded brake. High temperature. The adjustment blade 51 moves, at the same time lifting, following the vertical movement of the inhibitor blade 52 which is lifted by the wheel 7. Tooth "a" of the wheel 7 comes free of the adjustment blade 51.

View 3D: Brake expanded. High temperature. J>Jo. The adjustment blade 51, lifted at the same time as the inhibitor blade 52, moves tangentially to the wheel 7 and slides over the top of tooth "a" without driving this tooth, from which it is disengaged from the step illustrated in view 3C.

View 3E: Unexpanded brake. High temperature. J>Jo. The adjustment blade 51 returns to its position of rest. The inhibitor blade 52 remains resting on tooth "b", preventing the adjustment blade 51 from taking tooth "c".

View 3F: Unexpanded brake. Normal temperature. On cooling, the inhibitor blade 52 loses its purchase on tooth "b". Either the adjustment blade 51 is disengaged from tooth "a" for a clearance J<Jo, in which case the toothed wheel 7 has not turned far enough to allow tooth "c" to be taken when the adjustment blade 51 comes back and rests on this tooth "c", or the adjustment blade 51 is disengaged from tooth "a" for a clearance J≧Jo, in which case the toothed wheel 7 has taken tooth "c", but only this one.

Although the above description refers to a relatively advanced embodiment, in that it makes use of the possibility of the inhibitor blade moving transversely with respect to its plane, under the effect of a rise in temperature, it is also possible to use a simple inhibitor blade 52 which cannot deform with temperature, to avoid certain over adjustments of the brake which are caused by an abnormal radial deformation of the drum 1 under the effect of excessive mechanical loading.

It is actually a common occurrence that in such conditions, known brakes adjust the clearance by jumping several teeth at a time, something which can sometimes lead to the brake locking, even when there is no heating.

Now, since the inhibitor blade 52 moves, in the case where it accompanies a movement of the adjustment blade, in the same way as it moves in the event of heating, all that is required, as the person skilled in the art will readily understand, is for the teaching of the above description to be used to produce a brake in which, as soon as the adjustment blade 51 and the inhibitor blade 52 have moved by a travel that allows the adjustment blade 51 to take another tooth, the inhibitor blade intercepts the wheel 7 to prevent the adjustment blade 51 from taking any further teeth, as illustrated earlier.

According to another aspect of the invention, illustrated in FIG. 2, the lever 5 has, for example, a branch 53 arranged at right angles to the adjustment blade 51 and attached to it by a common base 54.

The branch 53 is, on the one hand, mounted so that it can pivot, via an end 55 distant from the base 54, on the pin 8 secured to the shoe 21 and, on the other hand, mounted so that it can pivot, via an end 56 adjacent to the base 54, on one end 63 of the strut 6.

Furthermore, the spring 4 which moves the shoes 21 and 22 closer together advantageously bears upon a point 57 of the branch 53 that is part way between the ends 55 and 56 of this branch 53, so that the pivoting of the lever 5 is obtained directly by the movements of the shoes 21 and 22, in a way known per se (see FIG. 1).

Finally, the lever 5 has, for example, a bent-over part 58 adjacent to the base 54 that is common to the adjustment blade 51 and to the branch 53, that is parallel to the plane XY of the inhibitor blade 52, and with which the inhibitor blade 52 is integral.

What is claimed is:

1. A drum brake comprising:
    a drum;
    first and second shoes in the shape of arcs of a circle arranged to face an internal face of said drum, said first and second shoes carrying respective first and second friction linings;
    an actuator inserted between said first and second shoes and operated selectively for moving said first and second shoes in a centrifugal movement toward said internal face of said drum;
    a spring connected to said first and second shoes for moving said first and second shoes closer together in a centripetal movement whenever said actuator is not operated;
    a rocking lever carrying an adjustment blade, said adjustment blade moving in a back and forth angular movement consisting of first and second pivoting movements in opposite directions which correlated with said centrifugal and centripetal movements of said first and second shoes;
    an adjustable-length strut inserted between said first and second shoes to limit said centripetal movement, said strut comprising first and second threaded elements forming a screw-nut connection, said strut having a length which is adjustable be unscrewing said screw-nut connection as said first and second friction linings wear; and
    a toothed wheel secured to one of said first and second threaded elements and selectively rotated by said adjustment blade during a first of said pivoting movements of said rocking lever, said adjustment blade extending, lengthwise, transversely with respect to said toothed wheel and developing widthwise in a mean plane parallel to said first pivoting movement and interfacing with said toothed wheel during said first pivoting movement rather more tangentially than radially, said rocking lever being further characterised by an inhibitor blade which extends lengthwise parallel to said adjustment blade and developing widthwise in a plane essentially perpendicular to said mean plane of said adjustment blade, flexible transversely with respect to said plane a position of rest within said plane, said inhibitor blade elastically moving from said position of rest by limited-amplitude deflection in the direction of widthwise development, said adjustment blade following said deflections of said inhibitor blade such that said toothed wheel escapes the influence of said adjustment blade when driven by said inhibitor blade after having been intercepted by said inhibitor blade.

2. The drum brake according to claim 1 wherein said inhibitor blade is further characterised by a bimetallic element that moves said inhibitor blade closer toward said toothed wheel by a transverse movement with respect to said plane with a rise in temperature.

3. The drum brake according to claim 1 wherein said lever is further characterised by a branch located at a right angle to said adjustment blade and attached to said adjustment blade at a common base, said branch having an first end a distance from said common base which pivotally engages a pin secured one of said first and second shoes, said branch having a second end adjacent said common base which pivotally engages said strut, said spring bearing on a point of said branch midway between said first and second ends.

4. The drum brake according to claim 3 wherein said rocking lever is further characterised by having a bent-over part adjacent said common base that is common with said adjustment blade and said branch, said bend-over part being parallel to said plane of said inhibitor blade.

5. The drum brake according to claim 2 wherein said lever is further characterised by a branch located at a right angle to said adjustment blade and attached to said adjustment blade at a common base, said branch having an first end a distance from said common base which pivotally engages a pin secured one of said first and second shoes, said branch having a second end adjacent said common base which pivotally engages said strut, said spring bearing on a point of said branch midway between said first and second ends.

* * * * *